W. PEARCE.
GOLF BALL.
APPLICATION FILED JULY 25, 1918.

1,286,081.

Patented Nov. 26, 1918.

Inventor
William Pearce
By Robert M Pierson
Atty.

UNITED STATES PATENT OFFICE.

WILLIAM PEARCE, OF AKRON, OHIO, ASSIGNOR TO THE B. F. GOODRICH COMPANY, OF NEW YORK, N. Y., A CORPORATION OF NEW YORK.

GOLF-BALL.

1,286,081.  Specification of Letters Patent.  Patented Nov. 26, 1918.

Application filed July 25, 1918. Serial No. 246,759.

*To all whom it may concern:*

Be it known that I, WILLIAM PEARCE, a citizen of the United States, residing at Akron, in the county of Summit and State of Ohio, have invented a certain new and useful Golf-Ball, of which the following is a specification.

This invention relates to the construction of playing-balls, and especially golf balls comprising a soft central core, a tense rubber winding surrounding said core, and an outer cover of gutta percha or similar material. One type of core which has been successfully employed consists of a vulcanized compound of rubber softened by a non-volatile oil or grease, such as petrolatum, together generally with a metallic weighting substance such as litharge, this core being very soft and mobile but at the same time partaking of the nature of a solid rather than a paste or plastic substance. The appearance and feeling of the vulcanized compound might be taken to indicate an absence of any free oil, and these cores have heretofore been used without an impervious covering, there being merely a few turns of broad rubber tape wrapped upon the core as a foundation upon which to wind the narrower tape of the tense rubber winding. It has been noted, however, that some of the oil in the vulcanized core squeezes out into the winding of rubber tape, causing a loss in volume of the core and a gradual softening and loss in tensile strength of the inner windings of rubber tape, so that the ball eventually loses considerable of its resiliency.

My present invention aims to overcome this difficulty, and, in connection with the remedy therefor, to provide an improved form of tense winding which will avoid the necessity for starting to wind the tape by hand, thus saving considerable time and labor in the manufacture of the ball.

Of the accompanying drawings.

Figure 1:
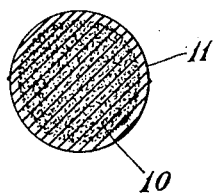
Figure 1 is a cross-section of my improved golf-ball core.
Figure 2:
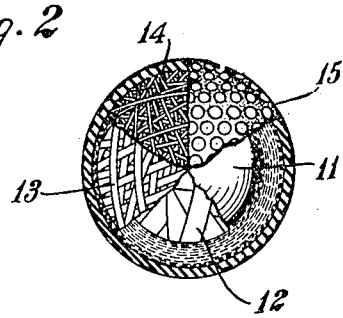
Fig. 2 is a sectional view of the ball with successive layers partly in elevation.

In the drawings, 10 is a central core body composed of rubber compounded with a suitable proportion of sulfur and a relatively-large amount of non-volatile oil or grease, preferably of a mineral nature, such as petrolatum, to which may be added a mineral weighting substance such as litharge. Upon this central core body I form a thin, soft cover 11 composed of a relatively-large proportion of rubber, that is, containing none or an inconsiderable quantity of other ingredients with the exception of enough sulfur to effect vulcanization. Two disks of the unvulcanized cover material are assembled with the unvulcanized body material and the edges closed together and cut off in a suitable die, after which the core is vulcanized in a spherical mold, the result being a very soft vulcanized core center having integrally united therewith a vulcanized cover sufficiently thin to avoid any substantial increase in the stiffness of the core, but substantially impervious to the escape of any of the free oil in the core body.

The cover 11 of this core is denser or tougher than the interior and is not so easily cut through. Consequently, whereas it has formerly been necessary to use rubber tape of about one inch normal width for the inner layers of the tense winding, and to apply these layers by the slow process of hand winding for which it is difficult to obtain skilled labor, I now find it possible to employ an inner winding of rubber tape 12 of a medium normal width such as one-half inch. This tape can be applied in the ordinary machines which are used for winding golf ball centers, at a considerable saving in time and labor. 13 represents the next or main winding of narrow rubber tape, and 14 the outer winding of rubber thread for securing adhesion to the gutta percha cover 15.

Golf balls of this construction may be more cheaply manufactured and will retain a high degree of resiliency for a longer time than any others of which I have knowledge. While I am aware that it has been common practice to inclose a liquid or plastic core in an impervious bag or sack in the manufacture of golf balls, it will be observed that my improved core, while exhibiting all the advantages of such structures in respect to mobility, is solid throughout, having an integrally-united cover and body, and may be cheaply manufactured by an ordinary die-forming or molding process.

I claim:

1. A playing-ball core composed of a body of rubber softened with a non-volatile oily substance and having an impervious rubber cover, all integrally vulcanized together.

2. A golf ball comprising a mobile solid core having a relatively-soft body and a relatively-tough exterior integral therewith, tense windings of rubber surrounding said core, and an outer cover.

3. A golf ball comprising a mobile solid core integrally formed with a cover of tougher texture than its central body, a tense winding of rubber tape of medium width surrounding said core, a tense winding of rubber tape of narrower width surrounding the first-said winding, and an outer cover.

4. A golf ball comprising a solid mobile core consisting of a vulcanized compound of rubber and a softening agent, having an impervious soft-rubber cover integrally vulcanized thereon, a tense winding of rubber tape surrounding said core, and an outer cover.

In testimony whereof I have hereunto set my hand this 15 day of July 1918.

WILLIAM PEARCE.